(12) United States Patent
Winarski et al.

(10) Patent No.: US 10,679,658 B1
(45) Date of Patent: Jun. 9, 2020

(54) REDUCTION OF AGING EFFECTS ON A MAGNETIC RECORDING TAPE IN A DUAL-REEL CARTRIDGE

(71) Applicant: International Business Machines Corporation, Armonk, NY (US)

(72) Inventors: Daniel J. Winarski, Tucson, AZ (US); Lee C. Randall, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/211,136

(22) Filed: Dec. 5, 2018

(51) Int. Cl.
*G11B 5/78* (2006.01)

(52) U.S. Cl.
CPC ..................... *G11B 5/78* (2013.01)

(58) Field of Classification Search
CPC ........... G11B 5/78; G11B 5/37; G11B 5/4833; G11B 5/6082
USPC ...................... 360/93, 235.1–235.5
See application file for complete search history.

(56) References Cited

U.S. PATENT DOCUMENTS

| | | | |
|---|---|---|---|
| 5,576,903 | A | 11/1996 | Brown et al. |
| 7,231,317 | B2 | 6/2007 | Todd et al. |
| 8,149,532 | B2 | 4/2012 | Hood et al. |
| 9,183,851 | B2 | 11/2015 | Bates et al. |
| 9,196,296 | B2 | 11/2015 | Bordynuik |
| 9,652,181 | B2 | 5/2017 | Bates et al. |
| 2004/0133378 | A1 | 7/2004 | Todd et al. |
| 2008/0204927 | A1* | 8/2008 | Saito ............... G11B 15/6656 360/85 |
| 2009/0284864 | A1 | 11/2009 | Hood et al. |
| 2010/0118430 | A1* | 5/2010 | Fujihara ............ G11B 27/328 360/55 |
| 2013/0229725 | A1 | 9/2013 | Bordynuik |
| 2015/0098149 | A1 | 4/2015 | Bates et al. |

FOREIGN PATENT DOCUMENTS

EP 1411716 A1 4/2004

OTHER PUBLICATIONS

Connolly et al., "Stress Analysis of Wound Magnetic Tape," Tribology and Mechanics of Magnetic Storage Systems, 1984, pp. 172-182.
Oracle, "Lowering Storage Costs with the World's Fastest, Highest Capacity Tape Drive," Oracle White Paper, Sep. 2013, 10 pages.
IBM, "IBM Magstar MP 3570 tape subsystem," IBM Archives, 2018, 3 pages, retrieved from https://www-03.ibm.com/ibm/history/exhibits/storage/storage_3570.html.

* cited by examiner

*Primary Examiner* — Allen T Cao
(74) *Attorney, Agent, or Firm* — Zilka-Kotab, P.C.

(57) ABSTRACT

A method for reducing aging effects on a magnetic recording tape, according to one embodiment, includes loading a dual-reel cartridge having a magnetic recording tape into an input/output device. A current load point of the magnetic recording tape is determined. At least one input/output operation is performed on the magnetic recording tape. An unload point on the magnetic recording tape that is different than the current load point of the magnetic recording tape is selected, and the magnetic recording tape is moved to the selected unload point. A date-time stamp associated with the selected unload point is sent for storage in the memory. The dual-reel cartridge is unloaded from the input/output device.

20 Claims, 11 Drawing Sheets

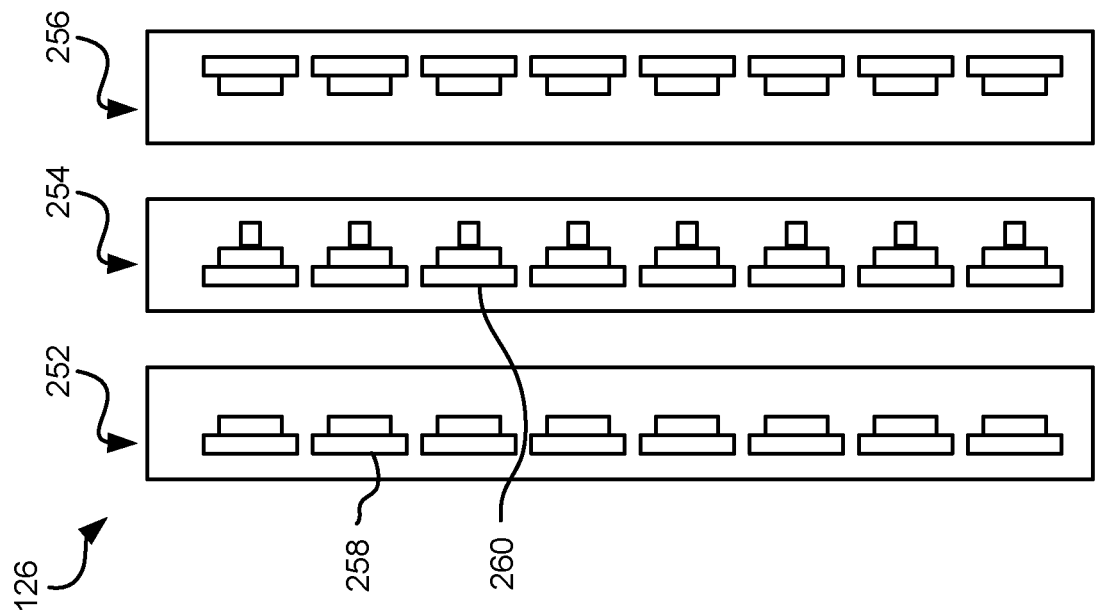
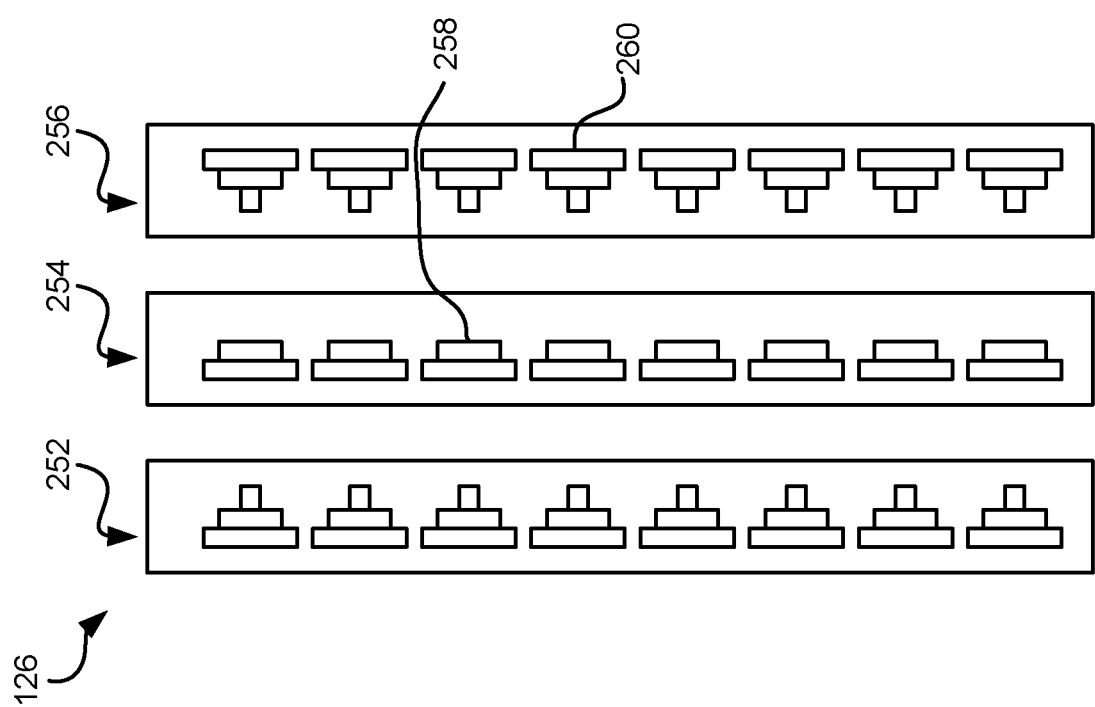

REDUCTION OF AGING EFFECTS ON A MAGNETIC RECORDING TAPE IN A DUAL-REEL CARTRIDGE

BACKGROUND

The present invention relates to data storage systems, and more particularly, this invention relates to reducing compression-based aging effects, or "creep," of a magnetic recording tape in a dual-reel cartridge.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

During non-operation, magnetic recording tapes are sometimes unloaded from tape drives, and stored for long durations of time. Changes in media lateral dimensions may occur during long periods of storage, such as long-term media creep (where the width of the tape creeps from its initial form, also known in the art as "aging"), which tends to occur over time when a tape is wound around a hub of a tape cartridge. Long-term media creep is particularly problematic when dealing with tape dimensional stability issues, as the two ends of the tape exhibit creep in different ways. The inner wraps of tape positioned closest to the cartridge hub tend to expand laterally over time due to the compressive stresses exerted thereon by the wraps of tape wound around them. Wraps positioned toward the outer diameter of the spool of tape are under less compressive stress, but are under higher tensile stresses, which tends to cause lateral contraction of the tape, i.e., the tape becomes narrower over time. Accordingly, the ends of the tape exhibit oppositely-oriented lateral dimensional changes.

When the dimensions of the tape, the head, or both change, various issues arise. During writing, the likelihood of overwriting shingled tracks increases. Overwritten data is often unrecoverable. Likewise, during readback, if readers are no longer over the tracks to be read, reading errors increase.

SUMMARY

A method for reducing aging effects on a magnetic recording tape according to one embodiment includes loading a dual-reel cartridge having a magnetic recording tape into an input/output device. A current load point of the magnetic recording tape is determined. At least one input/output operation is performed on the magnetic recording tape. An unload point on the magnetic recording tape that is different than the current load point of the magnetic recording tape is selected, and the magnetic recording tape is moved to the selected unload point. A date-time stamp associated with the selected unload point is sent for storage in the memory. The dual-reel cartridge is unloaded from the input/output device.

A computer program product for reducing aging effects on a magnetic recording tape according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of reducing compression-based creep of a magnetic recording tape, as well as operation and/or component parts thereof.

In one general embodiment, a method for reducing aging effects on a magnetic recording tape includes loading a dual-reel cartridge having a magnetic recording tape into an input/output device. A current load point of the magnetic recording tape is determined. At least one input/output operation is performed on the magnetic recording tape. An unload point on the magnetic recording tape that is different than the current load point of the magnetic recording tape is selected, and the magnetic recording tape is moved to the selected unload point. A date-time stamp associated with the selected unload point is sent for storage in the memory. The dual-reel cartridge is unloaded from the input/output device.

In another general embodiment, a computer program product for reducing aging effects on a magnetic recording tape includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Figure 1A:
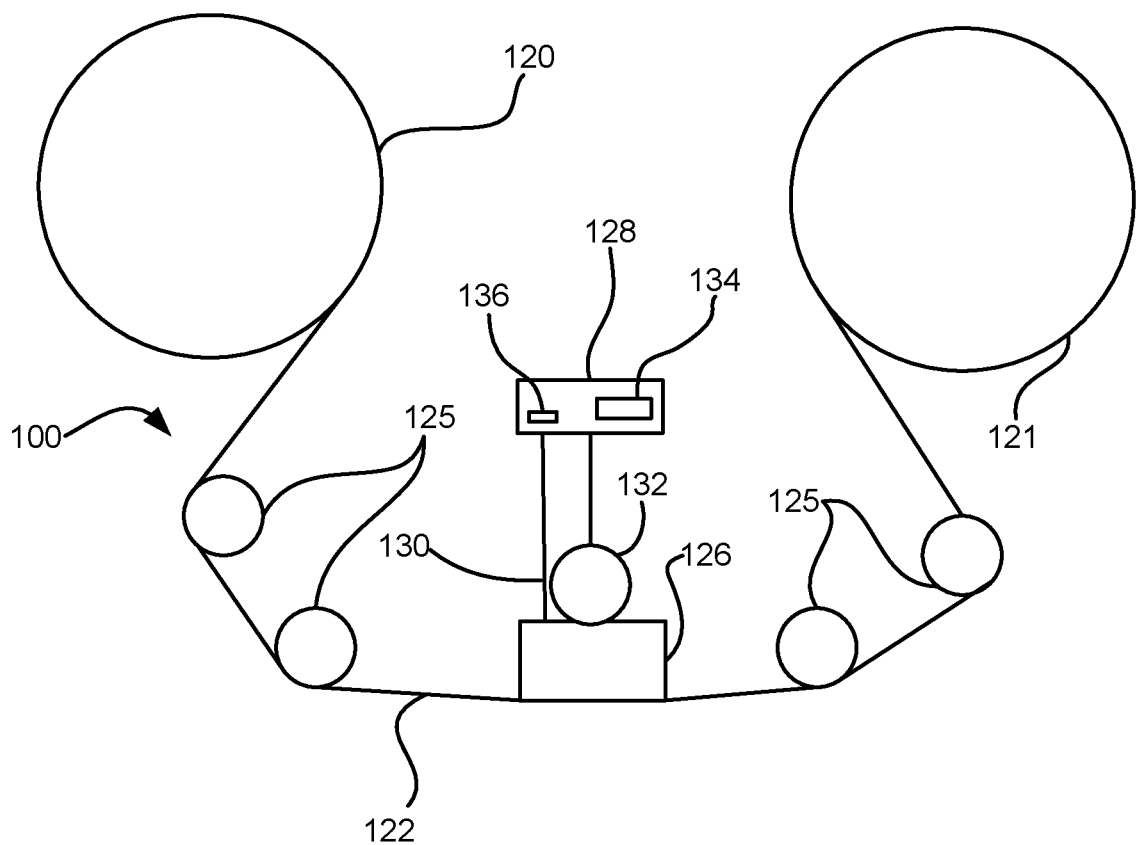
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
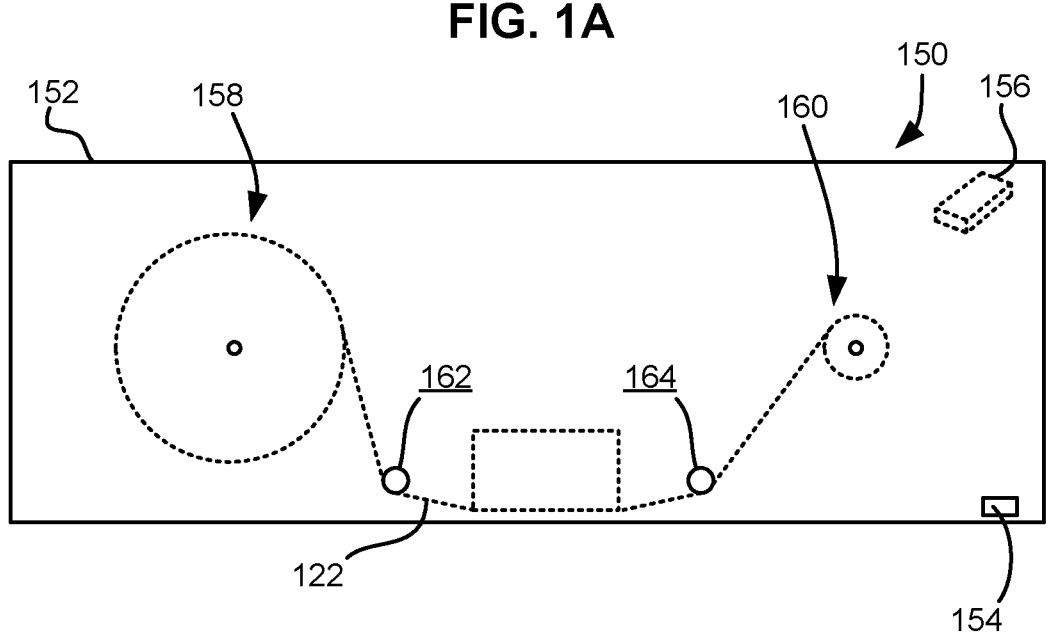
FIG. 1B is a schematic diagram of a dual-reel tape cartridge according to one embodiment.

FIG. 1B illustrates an exemplary dual-reel tape cartridge 150, e.g., having a first reel 158 and a second reel 160, according to one embodiment. Such tape cartridge 150 may be used with a system such as that shown in FIG. 1A, where the reels 120, 121 of FIG. 1A are the reels 158, 160 in FIG. 1B. As shown, the tape cartridge 150 includes a housing 152, a tape 122 in the housing 152, tape guides 162, 164, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the dual-reel tape cartridge 150. The nonvolatile memory is accessible by the tape drive and the tape operating software (the driver software), and/or another device.

Figure 2A:
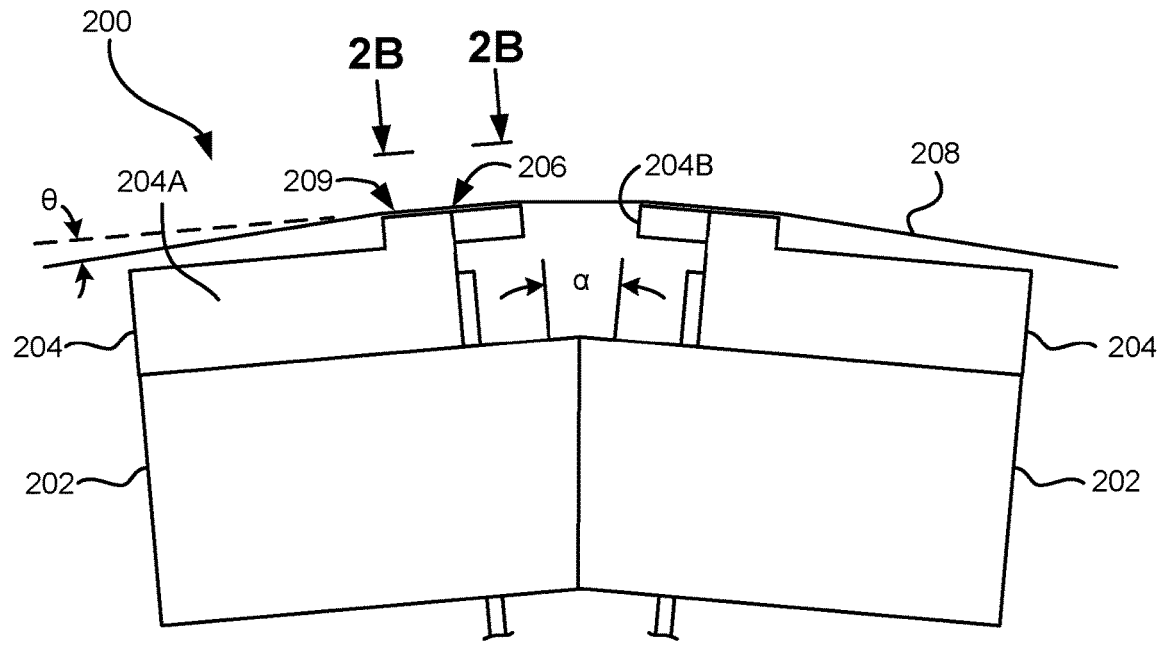
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
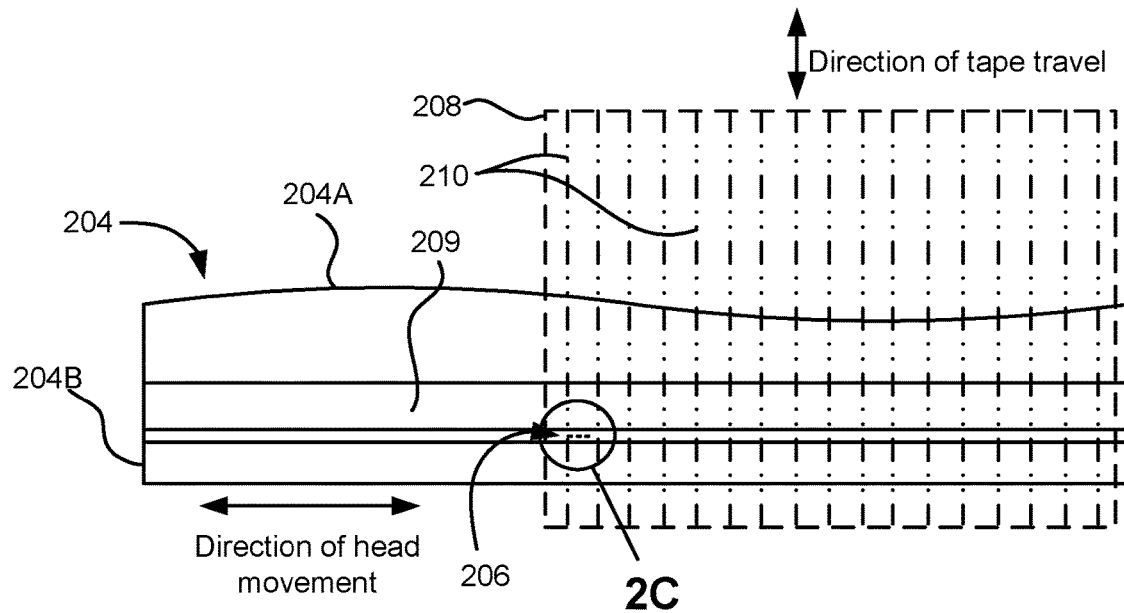
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
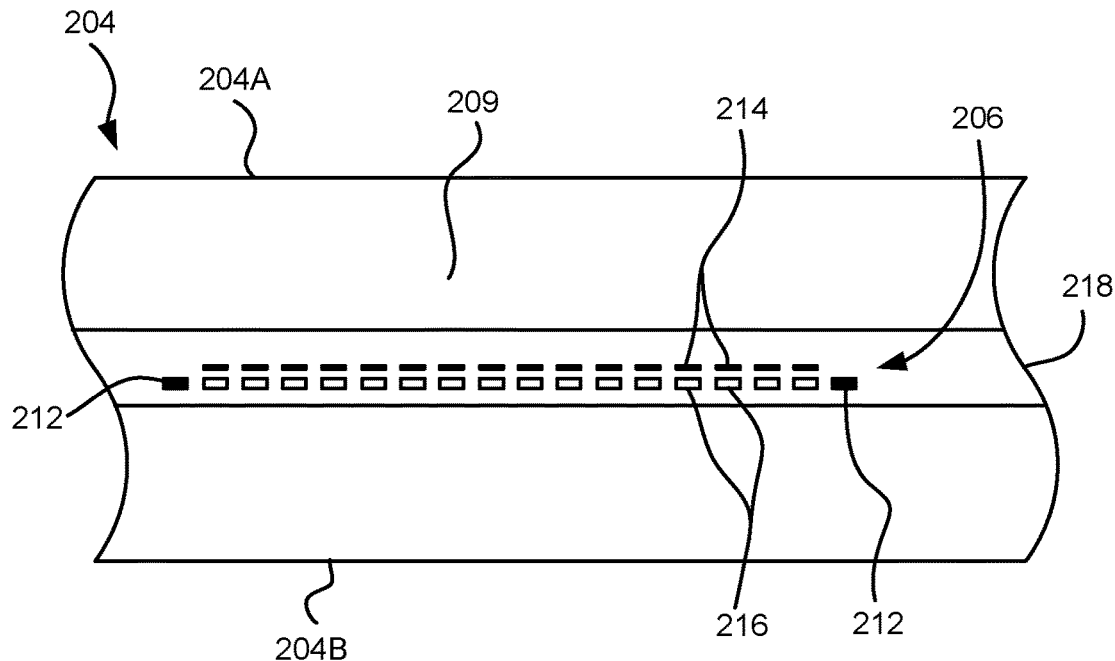
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
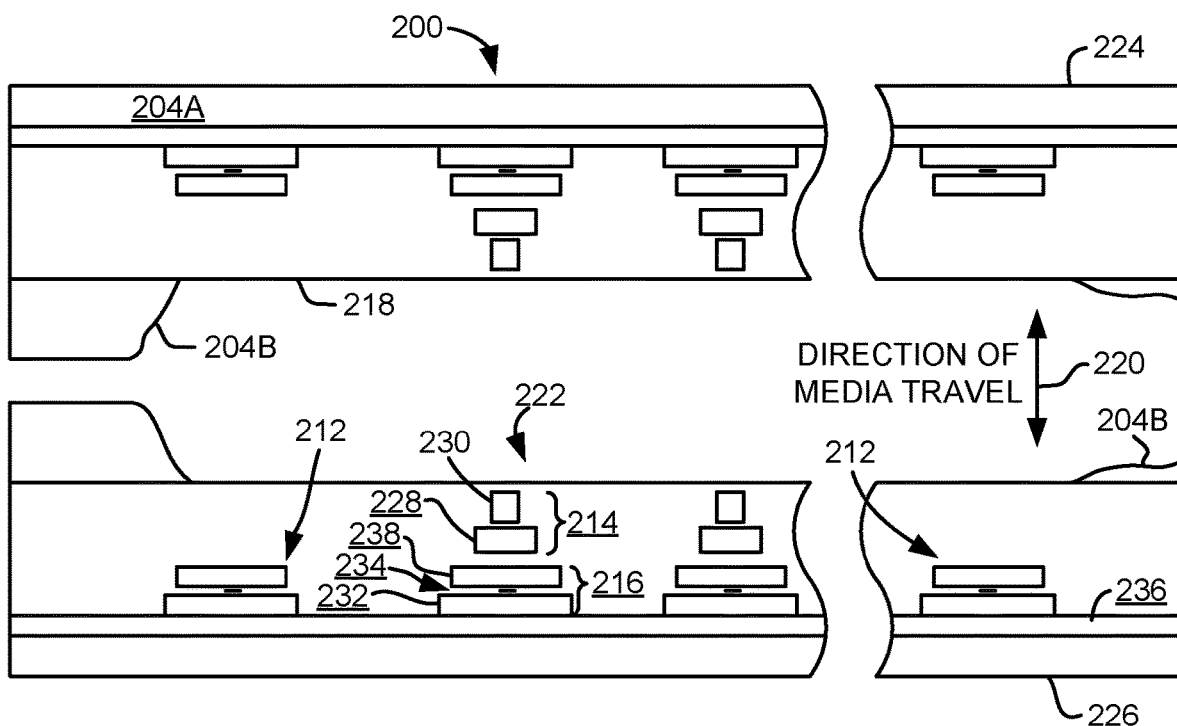
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
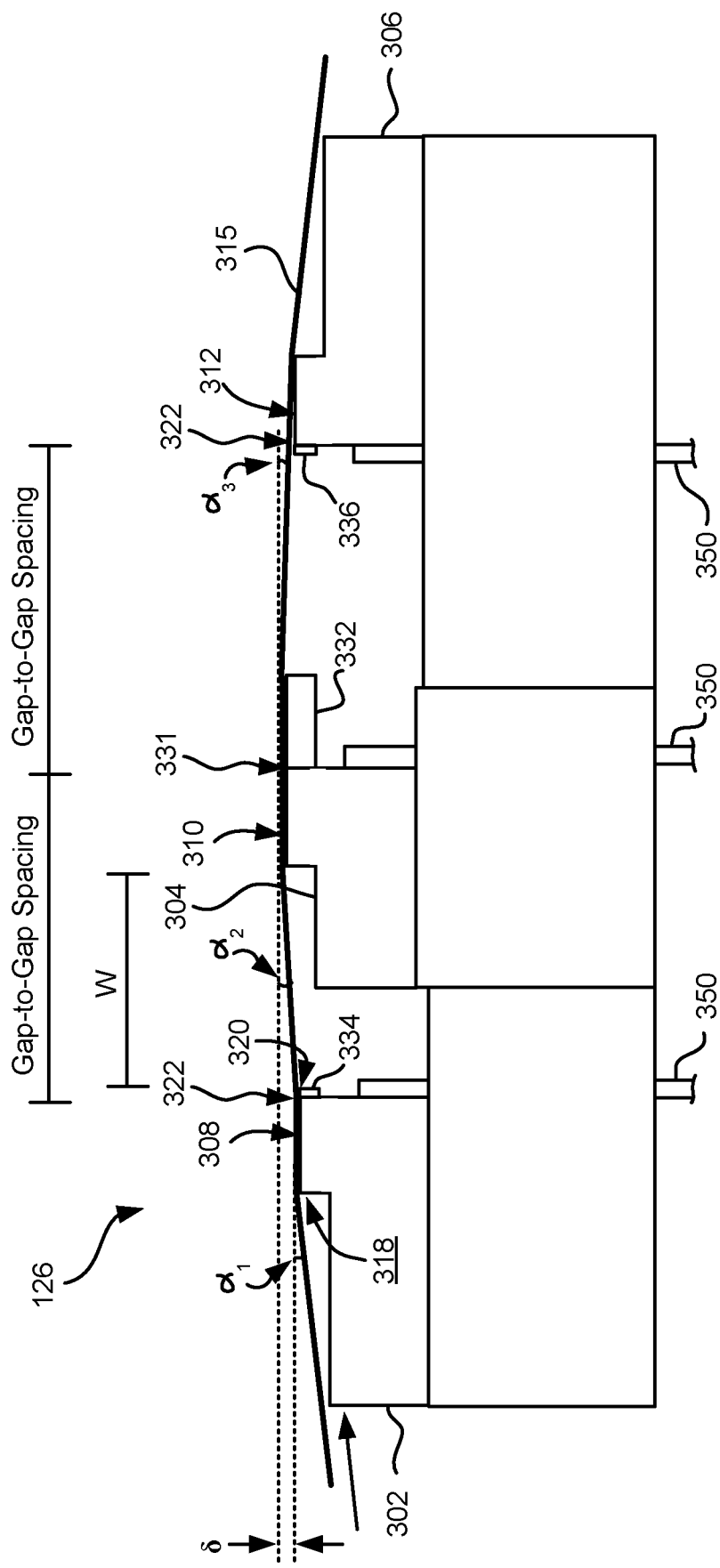
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
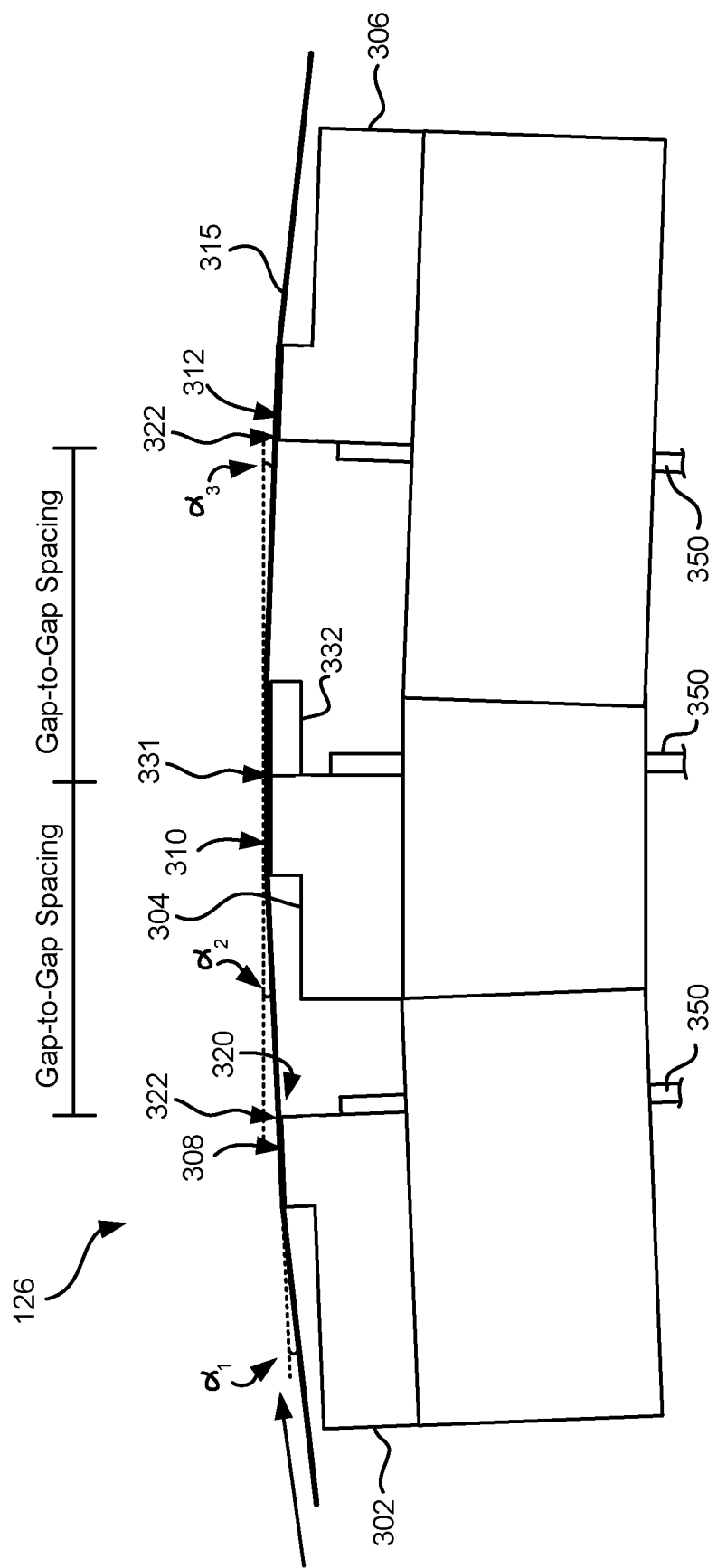
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
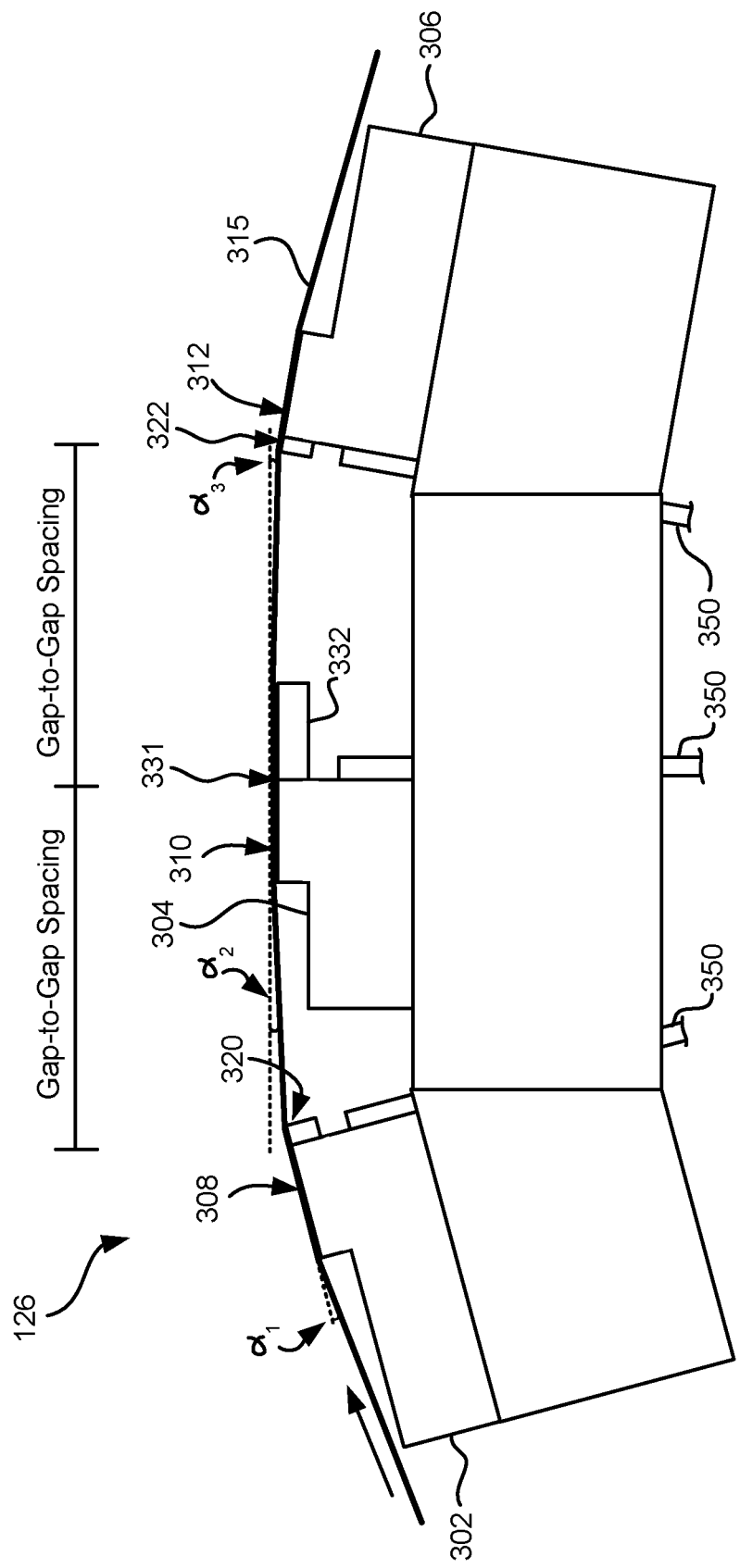
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
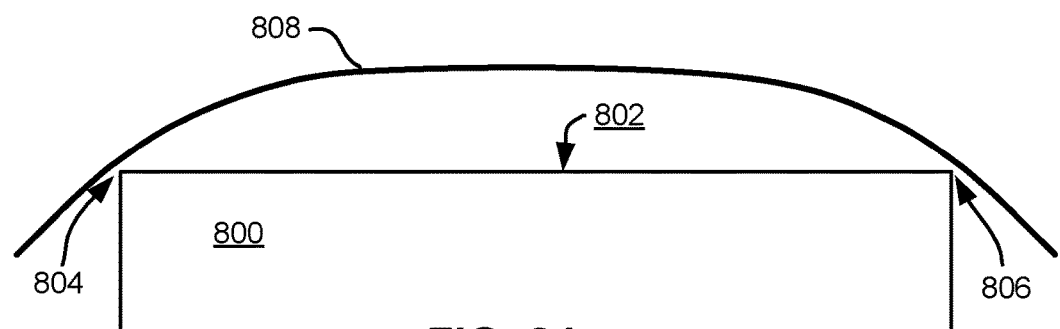
FIGS. 8A-8C are schematics depicting the principles of tape tenting.
Figure 8B:
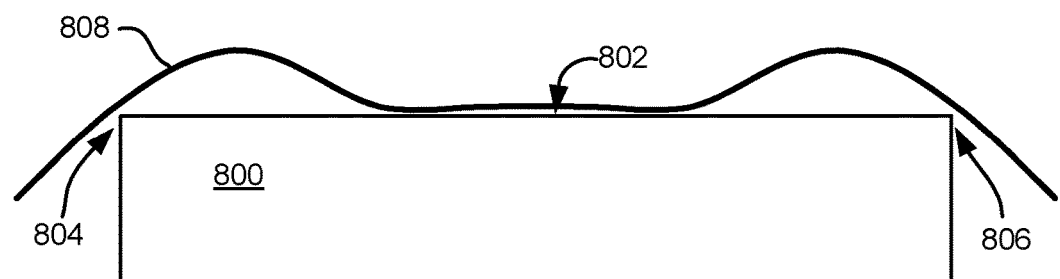
Figure 8C:
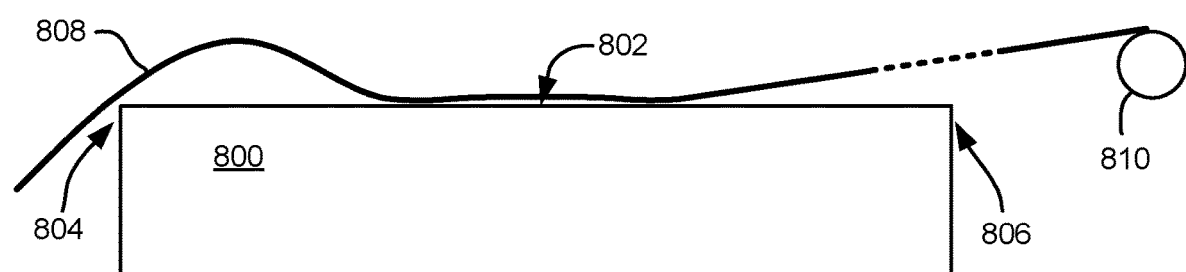

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
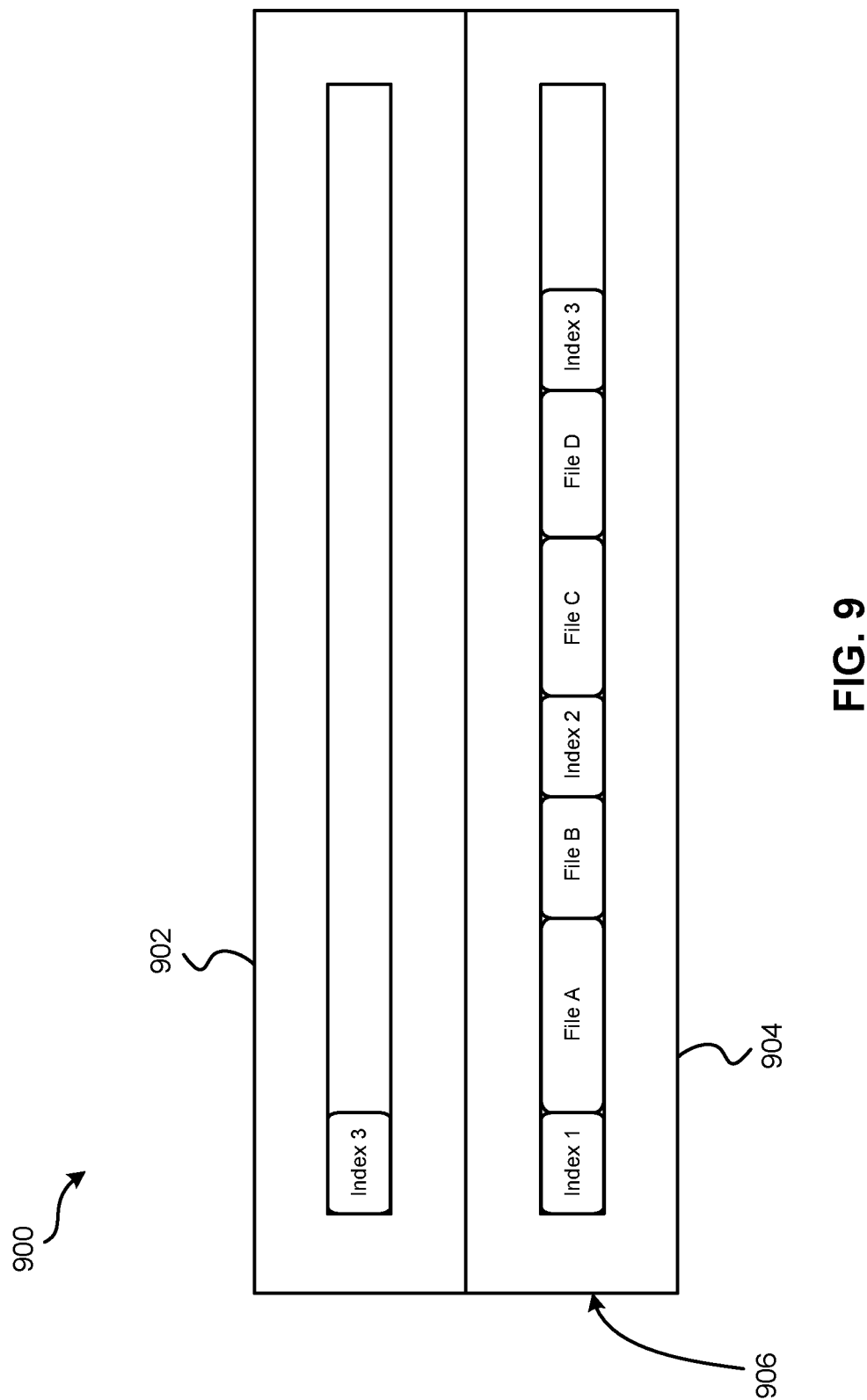
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

During non-use, cartridges having magnetic recording tapes therein are sometimes stored for prolonged periods of time in storage. As a result, the magnetic recording tapes may experience creep, e.g., due to radial compressive stress induced by the tape tension when the tape is wound around a spool prior to storage. Typically, magnetic recording tape creep is not considered a problem for magnetic recording tapes having relatively lower recording densities because any expansion of the tape is typically within permissible tolerances. However, magnetic recording tapes having relatively greater recording densities tend to have much lower reading and writing tolerances, and therefore any change in the tape width due to creep changes the spacing of data tracks on the tape, including the servo tracks and any data tracks previously written. Consequently, the change in tape dimensions is not replicated in the head, and so the transducers will be misaligned with the data tracks, resulting in problems such as overwriting during shingling and/or read errors.

In more detail, changes in media lateral dimensions may occur as a result of magnetic recording tape creep (also known in the art as "aging") during long-term storage of the magnetic recording tape. Such problematic creep tends to occur over time when a tape is wound around a hub of a tape cartridge. Long-term media creep is particularly problematic when dealing with tape dimensional stability issues, as the two ends of the tape wrapped around a hub exhibit creep in different ways. The inner wraps of tape positioned closest to the cartridge hub tend to expand laterally over time due to the compressive stresses exerted thereon by the wraps of tape wound around them. Wraps positioned toward the outer diameter of the spool of tape are under less compressive stress, but are under higher tensile stresses, which tends to cause lateral contraction of the tape, i.e., the tape becomes narrower over time. One reason for this is due to the occurrence of Poisson's ratio on the tape. Accordingly, the ends of the tape exhibit oppositely-oriented lateral dimensional changes.

When the dimensions of the tape, the head, or both change, various issues arise. During writing, the likelihood of overwriting shingled tracks increases. Overwritten data is often unrecoverable. Likewise, during readback, if readers are no longer over the tracks to be read, reading errors increase.

Figure 10:
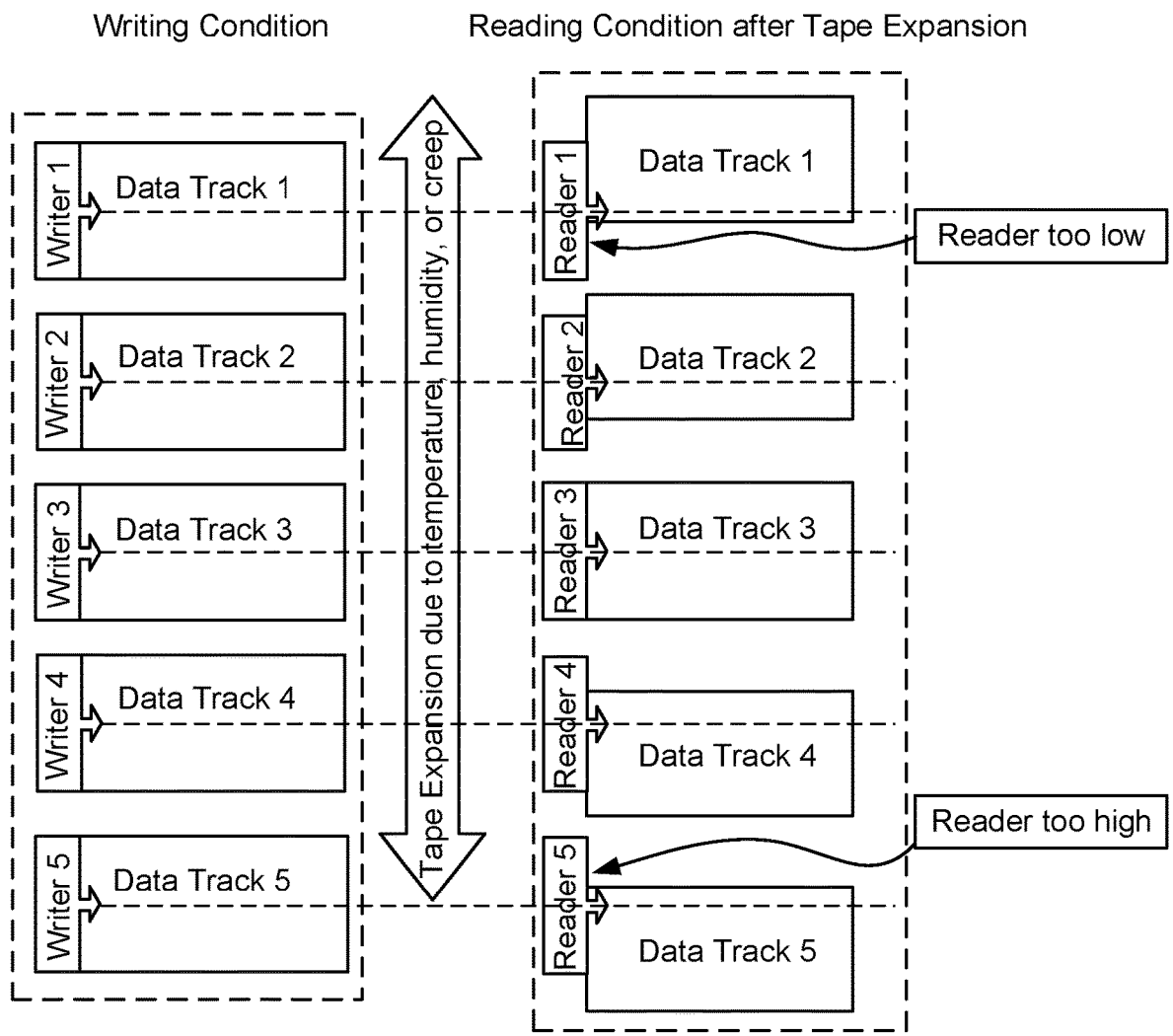
FIG. 10 is a representational diagram of the effect of tape lateral expansion and consequential transducer misregistration.
Figure 11:
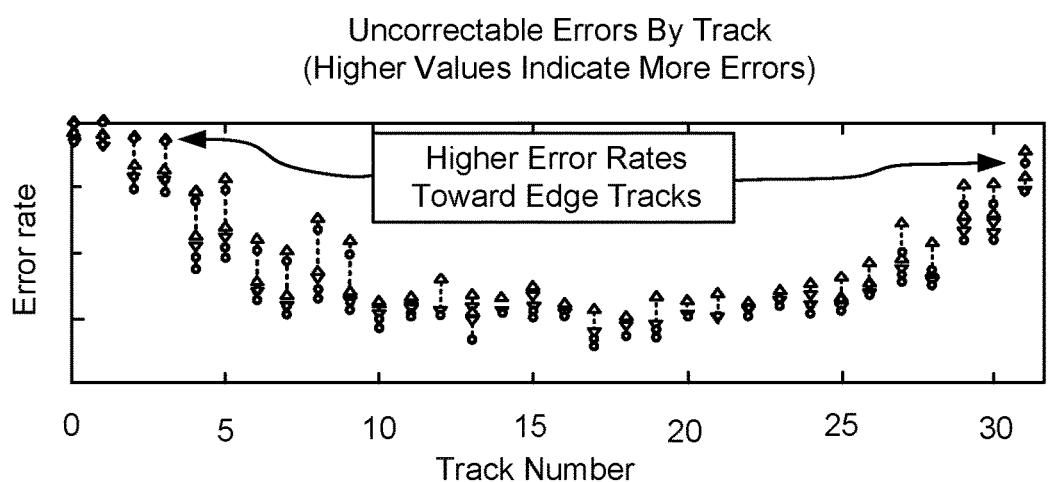
FIG. 11 is a chart exemplifying the increase in error rate toward outer ends of a reader array due to a misregistration of the readers toward the outer ends of the array.

For purposes of an example, FIG. 10 depicts the effect of a change in dimension of a head and/or tape after writing has occurred. For simplicity, five data tracks are shown, labeled Data Track 1 through Data Track 5. As shown, the data tracks are written at a certain spacing, referred to as the writing condition. However, some time after writing, the tape has expanded for some reason such as temperature, humidity, creep, etc. Assume the readers have the same spacing as the writers that wrote the data tracks. The track following system centers the middle reader on the middle track, but the outer readers are then partially off track due to the expanded condition of the tape. Accordingly, not only are the outer readers less influenced by the magnetic transitions of the outer data tracks, but shingled tracks adjacent the intended tracks influence the readers, creating noise. Thus, the misregistration results in a higher amount of read errors for tracks positioned toward the ends of the array. FIG. 11 is a chart exemplifying the increase in error rate toward outer ends of a reader array due to a misregistration of the readers toward the outer ends of the array. There is no position that the head move to that will improve readback.

In order to overcome the limitations mentioned above, techniques for mitigating problematic creep within dual-reel cartridges having magnetic recording tape therein are needed. Various techniques and approaches for reducing creep of a magnetic recording tape are presented herein.

Figure 12:
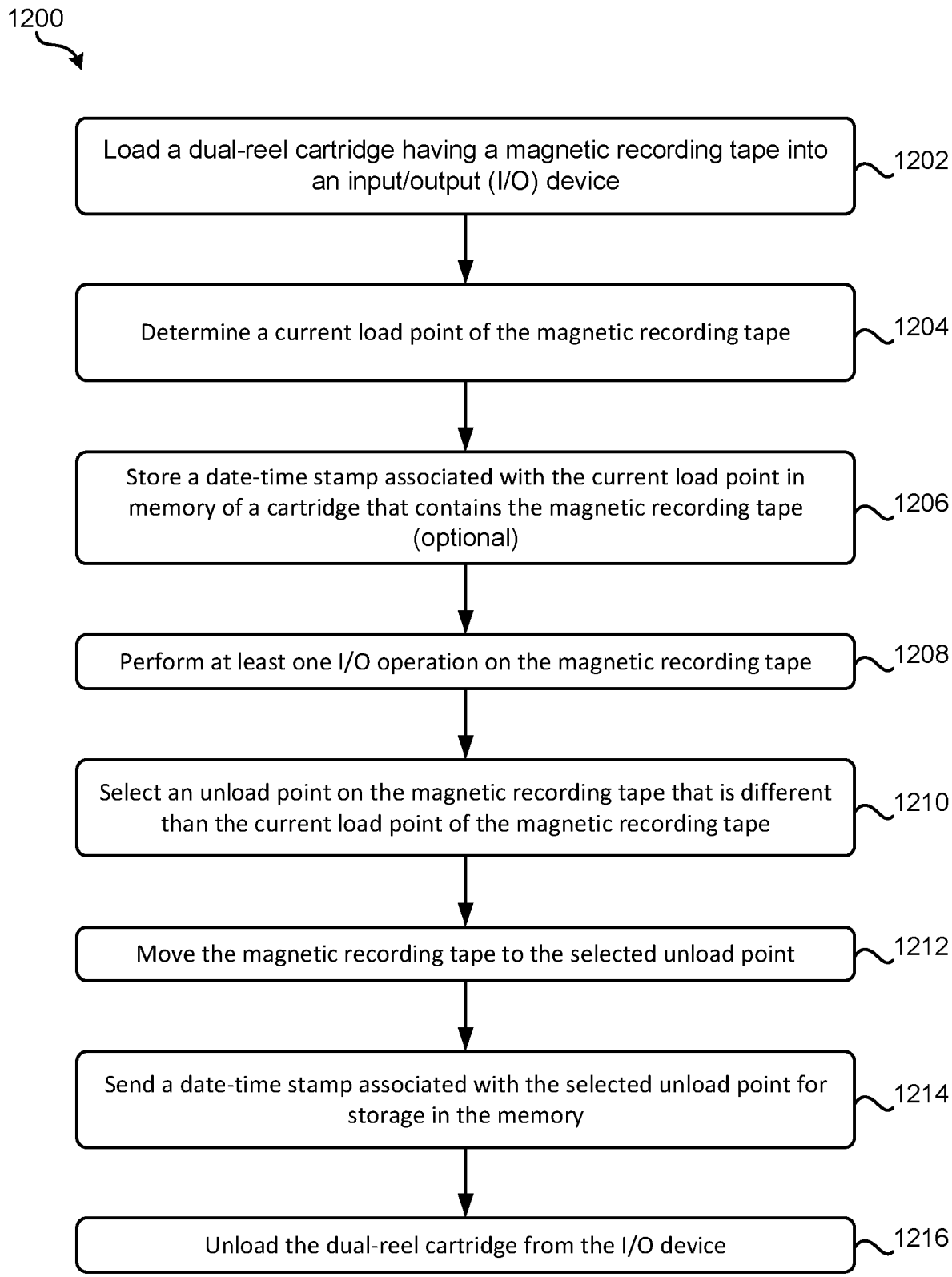
FIG. 12 is a flowchart of a method in accordance with one embodiment.

Now referring to FIG. 12, a flowchart of a method 1200 is shown according to one embodiment. The method 1200 may be performed in accordance with the present invention in any of the environments depicted in FIGS. 1-11, among others, in various embodiments. Of course, more or less operations than those specifically described in FIG. 12 may be included in method 1200, as would be understood by one of skill in the art upon reading the present descriptions.

Each of the steps of the method 1200 for reducing aging effects such as creep of a magnetic recording tape, may be performed by any suitable component of the operating environment. For example, in various embodiments, the method 1200 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

Operation 1202 includes loading a dual-reel cartridge having a magnetic recording tape into an input/output (I/O) device. The dual-reel cartridge may include any type of cartridge, and the magnetic recording tape therein may be configured to be written to using any one or more type(s) of writing, e.g., high-frequency recording signals, digital audio tape (DAT) recording, helical scans, etc. Moreover, the I/O device may be any type of device. For example, in a preferred approach, the I/O device is a tape drive. In one approach, the I/O device may reside within a data storage library, e.g., such as an automated storage library.

A current load point of the magnetic recording tape is determined in operation 1204 of method 1200. The current load point may be read from memory, e.g., as the stored unload point during a previous operation. The memory may include any known memory. For example, in one approach, the memory is a solid-state and/or radio-frequency identification (RFID) type memory component residing within or on the dual-reel cartridge. In another approach, the memory may additionally and/or alternatively be a virtual memory residing in a cloud memory (which in some approaches may include different information than the information stored on memory local to the dual-reel cartridge). Approaches for using a cloud memory, such as the Cartridge Memory (CM) database stored on a storage cloud described in U.S. Pat. No. 9,652,181, which is herein incorporated by reference, may be used. In yet another approach, the memory may additionally and/or alternatively be a predefined portion of the magnetic recording tape itself, e.g., such as an index portion of the magnetic recording tape. In a further approach, the load point may additionally and/or alternatively be determined from encoding on the magnetic recording tape, such as where the current load point is determined from linear positioning (LPOS) information encoded on the magnetic recording tape.

The determined current load point of the magnetic recording tape may be the approximate location on the magnetic recording tape that is positioned between the reels when the tape is loaded. The current load point is typically reflective of the location on tape between the reels when the tape is unloaded during a previous operation. This may correspond to a point specifically selected as the unload point during a previous use of the magnetic recording tape, the point at which reading and/or writing operations were last performed, etc.

In one approach, method 1200 includes performing an optional operation of storing in memory a date-time stamp associated with the current load point, e.g., see optional operation 1206. The date-time stamp generally serves as a reference marker indicating how long the tape was stored at the current load point, assuming a date-time stamp was also saved when the cartridge was unloaded. The data-time stamp may be used in any subsequent operations and/or decisions of method 1200, such as operation 1210. In some approaches, the date-time stamp associated with the current load point may be saved for future reference, such as for estimating creep over time. In one approach, by comparing the current date-time stamp to the previous date-time stamp, a determination may be made that the magnetic recording tape has been stationary within the cartridge for greater than a predetermined amount of time (threshold) that is known to result in creep, and an action may be taken in response thereto, such as allocating more processing resources to error correction.

At least one I/O operation may be performed on the magnetic recording tape, e.g., see operation 1208. For example, in some approaches, method 1200 includes performing reading and/or writing operations on the magnetic recording tape.

During performing of the at least one I/O operation on the magnetic recording tape, inevitably, at least some of the magnetic recording tape on a first reel of the dual-reel cartridge is moved to a second reel of the dual-reel cartridge and/or at least some of the magnetic recording tape on the second reel of the dual-reel cartridge is moved to the first reel of the dual-reel cartridge. As a result, the tension of at least some portions of the tape may be adjusted, e.g., restored to a predefined reading and/or writing tension, as a result of the at least one I/O operation being performed. Accordingly, restoring the tension of the magnetic recording tape to a predefined tension may at least in part reduce compression-based and tension-based creep of the magnetic recording tape. Further operations for providing an immediate, yet continuing strategy for reducing creep of the magnetic recording tape, such as a refresh operation, will also be described in various approaches below.

Operation 1210 of method 1200 includes selecting an unload point on the magnetic recording tape that is different than the load point of the magnetic recording tape determined in operation 1204. By selecting an unload point on the magnetic recording tape that is different than the current load point of the magnetic recording tape, compression on one portion of the tape is shifted to another portion of the tape, and consequently, compression-based creep of the magnetic recording tape will be reduced. For example, portions of the magnetic recording tape that may have previously developed creep during a previous duration of storing the magnetic recording tape may be allowed to return toward an original state as a result of the relieved radial compression thereon if the unload point is close to those portions. For example, assume that a portion of magnetic recording tape is positioned on an inner wrap of tape on a first reel of the cartridge at the current load point, and moving the magnetic recording tape to a selected unload point positions the portion of magnetic recording tape on an outer wrap of the tape on a second reel of the cartridge. Moreover, assume that the portion of magnetic recording tape has experienced compression-based creep while the magnetic recording tape was previously stored at the current load point, e.g., due to the compressive stresses exerted thereon by the wraps of tape wound around the portion of magnetic recording tape. As a result of moving the magnetic recording tape to the selected unload point that is different than the current load point of the magnetic recording tape, the portion of magnetic recording tape experiences less compression-based creep (if any). The portion of magnetic recording tape may recover at least in part from any deformation, and thereby return toward an intended form. Moreover, the portion may in fact experience tension-based creep (lateral contraction) that may speed up the recovery and/or counter effects of compression-based creep. As a result of implementing such operations into normal use and/or storage of the magnetic recording tape, the magnetic recording tape is prevented from accumulating problematic amounts of creep and in some cases is allowed to return to an original condition if creep already exists on the magnetic recording tape.

As a result of the reduction and prevention of creep on the magnetic recording tape, the compounding rate of reading and/or writing errors (previously described elsewhere herein, e.g., see FIGS. 10-11) is mitigated.

With continued reference to operation 1210 of method 1200, according to various approaches, the selected unload point may be any location on the magnetic recording tape other than the current load point of the magnetic recording tape. In some approaches, the magnetic recording tape may be logically divided into any number of sections, e.g., five logical sections, ten logical sections, fifteen logical sections, etc. where any point along any of such sections may be selected as the unload point. For example, in one approach, the magnetic recording tape may be logically divided into three sections, e.g., a beginning of the magnetic recording tape (BOT), a middle of the magnetic recording tape (MOT), and an end of the magnetic recording tape (EOT), where the MOT extends from the BOT to the EOT. In such an approach, the selected unload point may be selected from any location including about the BOT, a point along the MOT, and about the EOT, except the unload point is in a different section than the load point. In another example, the magnetic recording tape may be logically divided into five sections, e.g., a BOT, a first quarter of the magnetic recording tape (1QOT), MOT, a third quarter of the magnetic recording tape (3QOT), and EOT. In such an approach, the selected unload point may be selected from any location including about the BOT, a point along the 1QOT, about the MOT, a point along the 3QOT, and about the EOT, except the unload point is in a different section than the load point.

In some approaches, the unload point is additionally and/or alternatively selected from a group of predefined unload points. In at least some of such approaches, the predefined unload point that is determined, e.g., by comparing a history of previous unload points that is saved in the memory, to be previously least utilized may be selected as the unload point.

By judicious selection of unload points, an approximately uniform width of the magnetic recording tape (measured along a cross-track direction) may be established and maintained. This in turn minimizes the amount of expansion variations across the magnetic recording tape, e.g., due to creep, which would otherwise result in outer readers and/or writers of a head being off track, and the consequent problems with off-track reading and writing. In sharp contrast, as a result of implementation of one or more of the approaches and/or embodiments described herein into use and/or storage of dual-reel cartridges, any expansion and/or contraction (if any) across a magnetic recording tape of a dual-reel cartridge may be kept relatively uniform. Accordingly, several of the present approaches described herein improve writing and reading accuracies in magnetic recording based data storage.

In some other approaches, selection of an unload point may additionally and/or alternatively be based on a predefined pattern. Assuming that the magnetic recording tape is logically divided into three sections BOT, MOT, and EOT, in one example, ongoing selection of the unload point may follow the following predefined pattern: BOT, MOT, EOT, MOT, BOT, MOT, EOT, etc. Over time, use of such a predefined pattern for selection of an unload point preferably uses each of the logical sections an equal number of times as the unload point. However, in other approaches, predefined patterns of unload point selection may include using some of the logical sections as an unload point a different number of times.

In a simplified approach, ongoing selection of the unload point may follow the following predefined pattern: BOT, EOT, BOT, EOT, etc.

Other factors may be considered when selecting an unload point, such as length of time the tape was stored in one section. For example, if the tape was stored at BOT for more than a predetermined amount of time, and/or creep is observed at EOT during a read or write operation, then the tape may be unloaded at EOT rather than MOT to minimize further creep of the EOT and induce recovery.

Yet another factor that may be considered when selecting an unload point includes whether or not an error such as a loss-of-servo error has occurred, e.g., during performing of one or more I/O operations on the magnetic recording tape. In one approach, in response to determining that loss-of-servo error has occurred, the selected unload point may be the last working load point, e.g., the current load point of the magnetic recording tape. Note that various embodiments and/or approaches described elsewhere herein specify selecting an unload point on the magnetic recording tape that is different than the current load point of the magnetic recording tape, however, this is not the case in the present approach. This is because in some approaches where a loss-of-servo error is determined to have occurred, selecting the last working load point as the unload point (that will be the new current load point upon subsequently remounting the cartridge) may have a greater chance of success in recovering from such loss-of-servo error than otherwise selecting some other point on the magnetic recording tape as the unload point/subsequent load point would.

Operation 1212 of method 1200 includes moving the magnetic recording tape to the selected unload point. In some approaches, the magnetic recording tape may already be positioned at the selected unload point subsequent the performing of at least one I/O operation on the magnetic recording tape, e.g., see operation 1208. In such approaches, the magnetic recording tape may not be moved an additional extent.

In addition, other remedial measures may be performed in conjunction with operation 1212. For example, in some approaches, at least one cartridge refresh may be performed prior to moving the magnetic recording tape to the selected unload point. The cartridge refresh preferably includes moving all of the magnetic recording tape to the first reel of the dual-reel cartridge and/or moving all of the magnetic recording tape to the second reel of the dual-reel cartridge. As a result of performing the cartridge refresh, a constant predefined tape tension, e.g., predefined by an administrator of a data storage library that includes the magnetic recording tape, predefined by a manufacturer of the magnetic recording tape, etc., may be applied to the magnetic recording tape as the magnetic recording tape is moved to the selected unload point. For example, in one preferred approach, the constant predefined tape tension may be a storage tension that is relatively less taught than the tension using during reading and/or writing operations on the magnetic recording tape. The lower tension results in the tape wrapping less tightly around the reels, and consequently, less compressive stress on the inner winds of the magnetic recording tape. Moreover, portions of the magnetic recording tape that may not have been moved during performing of the I/O operation(s), e.g., instead remained on the same reel of the dual-reel cartridge during performing of the I/O operation(s), may be moved.

In some approaches, information about the selected unload point is preferably stored for later reference. For example, operation 1214 of method 1200 includes sending a date-time stamp associated with the selected unload point for storage in any memory location, e.g., local memory of the dual-reel cartridge, an index on the magnetic recording tape (such as an a known location on the tape), cloud based memory, etc. Preferably, the current unload point is also stored, e.g., with the date-time stamp, as part of the date-time stamp, separately therefrom, etc. During and/or subsequent a next loading of the magnetic recording in an I/O device, the date-time stamp associated with the selected unload point may be accessed for any number of reasons. For example, in one approach, the date-time stamp associated with the selected unload point may be considered when subsequently selecting a next unload point. In a more specific example, the date-time stamp associated with the selected unload point may be subsequently considered when a next unload point is to be selected based on a determined previously least utilized unload point. In another approach, the date-time stamp associated with the selected unload point may additionally and/or alternatively be considered for determining a current load point of the magnetic recording tape.

The memory of the dual-reel cartridge may additionally and/or alternatively include other relevant information such as, e.g., a tension that was applied to the magnetic recording tape when the tape was last moved to the unload point. That tension correlates to how tightly wound the tape is around the reel, and consequently the potential magnitude of compressive stress applied to the tape.

Operation 1216 of method 1200 includes unloading the dual-reel cartridge from the I/O device. In some approaches, the unloaded dual-reel cartridge is stored in storage until a next use of the dual-reel cartridge. The storage location of the dual-reel cartridge may be any location, e.g., within a data storage library, on a shelf in a room, in a temperature controlled storage room, etc.

The method 1200 may be performed in response to any trigger event. For example, the method 1200 may be performed in response to receiving a read and/or write request.

The method 1200 may be performed in response to determining that the tape should be moved based on some predefined criteria. For example, the tape may be moved based on the duration of time that the tape has been stored at a temperature and/or humidity, e.g., a temperature/humidity of an environment in which the dual-reel cartridge currently resides and/or has been residing, a determined temperature/humidity within the cartridge, etc.

As will now be described below, in some approaches, method 1200 may be repeated in response to determining that conditions which promote tape-based creep exist. In some approaches, one or more operations of method 1200 may be repeated in response to determining that a condition is true. For example, in one approach, method 1200 may be repeated in response to determining that a predefined amount of temperature change, e.g., greater than one tenth of a degrees Celsius, greater than five degrees Celsius, greater than fifteen degrees Celsius, etc., has occurred within the environment in which the dual-reel cartridge currently resides. In such an approach, the predefined amount of temperature change specified for repeating method 1200 may be predefined by any source, e.g., an administrator of a storage library that contains the dual-reel cartridge, a manufacturer of the magnetic recording tape, a user, etc. Repeating method 1200 in response to determining that a predefined amount of temperature change has occurred within the environment in which the dual-reel cartridge currently resides may protect the magnetic recording tape from the undesirable effects of creep discussed elsewhere herein. This is because, in summary, repeating method 1200 in response to determining the predefined amount of temperature change may prevent the magnetic recording tape from being subjected to a damaging range of temperatures while being stored at the single unload point. In repeating method 1200 in response to determining that such a condition is true, I/O operations will be performed in the magnetic recording tape and/or the unload point will be changed before a damaging amount of creep is able to accrue on the magnetic recording tape.

In some approaches, method 1200 optionally includes introducing a higher temperature to the cartridge and magnetic recording tape than the current temperature of the environment in which the dual-reel cartridge currently resides. For example, in some approaches the dual-reel cartridge may benefit from being stored at a lower extent of an operational temperature range of the dual-reel cartridge, e.g., as specified by manufacturers. However, in response to such a storage temperature being less than a predefined temperature for performing reading and/or writing operations, heat may be applied into the environment in which the magnetic recording tape is located. For example, heat may be applied using a known temperature control unit.

For reference, a preferred but non-limiting range of temperatures in which the magnetic recording tape may be stored includes 10-20° C. Moreover, a non-limiting operational range of temperatures in which the magnetic recording tape may be read from and/or written to includes 10-40° C.

Because a cause of creep may additionally and/or alternatively be time, e.g., a time in which the magnetic recording tape remains stationary, in another approach, the condition for repeating method 1200 may additionally and/or include a predetermined amount of time having elapsed since an I/O operation has been performed on the magnetic recording tape.

In some approaches, the predetermined amount of time is preferably less than an amount of time in which creep is known and/or is expected to form within the dual-reel cartridge. This time may be predetermined using any one or more sources, e.g., an administrator, a manufacturer, a technician performing maintenance on the dual-reel cartridge, etc.

Moreover, in yet another approach, the predetermined amount of time may additionally and/or alternatively be a predetermined maximum amount of time that the magnetic recording tape is allowed to be stored at the unload point. By enforcing a maximum amount of time that the magnetic recording tape is allowed to be stored at any particular unload point, the magnetic recording tape will not be permanently deformed as a result of storage, as might otherwise occur in long-term storage of a magnetic recording tape at the same unload point. Instead, upon determining that the magnetic recording tape has been stored for the predetermined maximum amount of time at the selected unload point and/or is approaching the maximum amount of time while being stored at the selected unload point, the method 1200 may be repeated.

Moreover, by enforcing a maximum amount of time that the magnetic recording tape is allowed to be stored at any particular unload point, tension across the magnetic recording tape while in storage may be equalized. This is because unload points will over time be equally distributed across the divisions of the magnetic recording tape, e.g., BOT, MOT, EOT, etc. Accordingly, in response to dispersing the forces exerted on the magnetic recording tape over time, manufacturing-specified dimensions of the magnetic recording tape will also be maintained, e.g., as a result of mitigating expanded conditions of the magnetic recording tape that otherwise conventionally occurs, e.g., see FIGS. 10-11. Of course this will translate to steady and relatively high degrees of reading and writing accuracies, as compared to the diminished reading and writing accuracies that would otherwise occur if expanded conditions of the magnetic recording tape were not corrected and/or prevented using the techniques of various approaches and/or embodiments described herein.

Method 1200 may additionally and/or alternatively be performed in response to determining that utilization of the I/O device and/or any other device of a data storage library, is below a predetermined threshold. For example, in some approaches, a determination that utilization is below a predetermined threshold may indicate that an I/O device may be used without significantly impacting overall performance of the storage system. In response to such a determination, in one approach, an I/O device may be utilized for changing the current unload point of the magnetic recording tape. Accordingly, at least once during a duration in which the system in which method 1200 is being performed is relatively less busy, method 1200 may be performed for reducing creep of the magnetic recording tape.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for reducing aging effects on a magnetic recording tape comprising:
    loading a dual-reel cartridge having the magnetic recording tape into an input/output device;
    determining a current load point of the magnetic recording tape;
    performing at least one input/output operation on the magnetic recording tape;
    selecting an unload point on the magnetic recording tape that is different than the current load point of the magnetic recording tape;
    moving the magnetic recording tape to the selected unload point;
    sending a date-time stamp associated with the selected unload point to a memory for storing the date-time stamp therein; and
    unloading the dual-reel cartridge from the input/output device.

2. A method as recited in claim 1, wherein the selected unload point is selected from the group consisting of: about a beginning of the magnetic recording tape, a point along a middle of the magnetic recording tape, and about an end of the magnetic recording tape.

3. A method as recited in claim 1, wherein the unload point is selected from a group of predefined unload points, wherein a predefined unload point that is determined to be previously least utilized is selected as the unload point.

4. A method as recited in claim 1, wherein the current load point is determined from the memory, wherein the memory is a local memory of the dual-reel cartridge.

5. A method as recited in claim 1, wherein the current load point is determined from the memory, the memory being a virtual memory residing in a cloud memory.

6. A method as recited in claim 1, comprising performing a cartridge refresh prior to moving the magnetic recording tape to the selected unload point.

7. A method as recited in claim 1, wherein the input/output device resides within an automated storage library.

8. A method as recited in claim 1, wherein the unload point is selected from a table of unload points correlated to predefined temperatures, and comprising determining a temperature of an environment in which the dual-reel cartridge currently resides, and selecting, as the selected unload point, a predefined unload point in the table, the predefined unload point in the table corresponding to the temperature of the environment in which the dual-reel cartridge currently resides.

9. A method as recited in claim 8, comprising repeating the method in response to determining a condition is true, the condition being selected from the group consisting of: a predefined amount of temperature change within the environment in which the dual-reel cartridge currently resides has occurred, and a predetermined amount of time has elapsed since an input/output operation has been performed on the magnetic recording tape.

10. A computer program product for reducing aging effects on a magnetic recording tape, the computer program product comprising a computer readable storage medium having program instructions embodied therewith, wherein the computer readable storage medium is not a transitory signal per se, the program instructions readable and/or executable by a computer to cause the computer to perform a method comprising:
loading, by the computer, a dual-reel cartridge having the magnetic recording tape into an input/output device;
determining, by the computer, a current load point of the magnetic recording tape;
performing, by the computer, at least one input/output operation on the magnetic recording tape;
selecting, by the computer, an unload point on the magnetic recording tape that is different than the current load point of the magnetic recording tape;
moving, by the computer, the magnetic recording tape to the selected unload point;
sending, by the computer, a date-time stamp associated with the selected unload point to a memory for storing the date-time stamp therein; and
unloading, by the computer, the dual-reel cartridge from the input/output device.

11. A computer program product as recited in claim 10, wherein the selected unload point is selected from the group consisting of: about a beginning of the magnetic recording tape, a point along a middle of the magnetic recording tape, and about an end of the magnetic recording tape.

12. A computer program product as recited in claim 10, wherein the unload point is selected from a group of predefined unload points, wherein a predefined unload point that is determined to be previously least utilized is selected as the unload point.

13. A computer program product as recited in claim 10, wherein the current load point is determined from the memory, wherein the memory is a local memory of the dual-reel cartridge.

14. A computer program product as recited in claim 10, wherein the current load point is determined from the memory, the memory being a virtual memory residing in a cloud memory.

15. A computer program product as recited in claim 10, the program instructions readable and/or executable by the computer to cause the computer to perform the method comprising: performing a cartridge refresh prior to moving the magnetic recording tape to the selected unload point.

16. A computer program product as recited in claim 10, wherein the input/output device resides within an automated storage library.

17. A computer program product as recited in claim 10, wherein the unload point is selected from a table of unload points correlated to predefined, and the program instructions readable and/or executable by the computer to cause the computer to perform the method comprising: determining, by the computer, a temperature of an environment in which the dual-reel cartridge currently resides, and selecting, by the computer, as the selected unload point, a predefined unload point in the table, the predefined unload point in the table corresponding to the temperature of the environment in which the dual-reel cartridge currently resides.

18. A computer program product as recited in claim 17, the program instructions readable and/or executable by the computer to cause the computer to perform the method comprising: repeating the method in response to determining a condition is true, the condition being selected from the group consisting of: a predefined amount of temperature change within the environment in which the dual-reel cartridge currently resides has occurred, and a predetermined amount of time has elapsed since an input/output operation has been performed on the magnetic recording tape.

19. A system, comprising:
a processor; and
logic integrated with the processor, executable by the processor, or integrated with and executable by the processor, the logic being configured to:
load a dual-reel cartridge having a magnetic recording tape into an input/output device;
determine a current load point of the magnetic recording tape;
perform at least one input/output operation on the magnetic recording tape;
select an unload point on the magnetic recording tape that is different than the current load point of the magnetic recording tape;
move the magnetic recording tape to the selected unload point;
send a date-time stamp associated with the selected unload point to a memory for storing the date-time stamp therein; and
unload the dual-reel cartridge from the input/output device.

20. A system as recited in claim 19, wherein the selected unload point is selected from the group consisting of: about a beginning of the magnetic recording tape, a point along a middle of the magnetic recording tape, and about an end of the magnetic recording tape.

* * * * *